United States Patent [19]
Herbst et al.

[11] Patent Number: 4,872,959
[45] Date of Patent: Oct. 10, 1989

[54] ELECTROLYTIC TREATMENT OF LIQUIDS

[75] Inventors: Robert J. Herbst, Parker, Colo.;
Russell R. Renk, Laramie, Wyo.

[73] Assignee: Cleanup & Recovery Corp. (CURE), Denver, Colo.

[21] Appl. No.: 102,681

[22] Filed: Sep. 30, 1987

Related U.S. Application Data

[63] Continuation-in-part of Ser. No. 74,680, Jul. 17, 1982, abandoned, which is a continuation-in-part of Ser. No. 59,998, Jun. 9, 1987, abandoned.

[51] Int. Cl.$^4$ ............................ C25C 1/20; C25F 5/00; C25B 9/00
[52] U.S. Cl. ..................................... 204/109; 204/131; 204/149; 204/186; 204/228; 204/272; 204/302
[58] Field of Search ................. 204/260, 272, 263–266, 204/275–278, 255–257, 228, 109, 149, 152, 302, 186, 131, 109

[56] References Cited

U.S. PATENT DOCUMENTS

| | | | |
|---|---|---|---|
| 3,793,173 | 2/1974 | Kawahata et al. | 204/149 |
| 3,801,482 | 4/1974 | King | 204/152 |
| 3,801,488 | 4/1974 | Okuhara et al. | 204/260 X |
| 3,871,989 | 3/1975 | King | 204/272 X |
| 3,915,822 | 10/1975 | Veltman | 204/149 X |
| 3,923,629 | 12/1975 | Shaffer | 204/149 X |
| 3,964,991 | 6/1976 | Sullins | 204/275 |
| 3,969,245 | 7/1976 | Ramirez | 210/44 |
| 4,004,994 | 1/1977 | Andrus | 204/149 |
| 4,036,726 | 7/1977 | Gale et al. | 204/231 |
| 4,043,881 | 8/1977 | Yen et al. | 204/102 |
| 4,045,326 | 8/1977 | King | 204/272 X |
| 4,048,031 | 9/1977 | Valanti | 204/149 |
| 4,104,142 | 8/1978 | King | 204/180 |
| 4,123,339 | 10/1978 | Gale et al. | 204/149 |
| 4,125,445 | 11/1978 | Hurley | 204/149 |
| 4,149,953 | 4/1979 | Rojo | 204/269 |
| 4,171,256 | 10/1979 | Themy | 204/239 |
| 4,177,116 | 12/1979 | Denora | 204/272 X |
| 4,201,651 | 5/1980 | Themy | 204/217 |
| 4,202,752 | 5/1980 | Sherwood et al. | 204/260 X |
| 4,236,992 | 12/1980 | Themy | 204/278 |
| 4,293,400 | 10/1981 | Liggett | 204/302 |
| 4,316,787 | 2/1982 | Themy | 204/242 |
| 4,367,127 | 1/1983 | Messing | 204/260 X |
| 4,378,276 | 3/1983 | Liggett, et al. | 204/149 |
| 4,426,261 | 1/1984 | Fushihara | 204/260 X |
| 4,443,320 | 4/1984 | King | 204/272 X |
| 4,445,990 | 5/1984 | Kim et al. | 204/151 |

OTHER PUBLICATIONS

Brinecell Manufacturing Corporation flyer, entitled "Sewage Treating Cell Brinecell Model '130'".
Purifying Oily Wastewater by Electrocoagulation, Plant Engineering, Sep., 1981, pp. 124–125.
PCT International Search Report.

Primary Examiner—Donald R. Valentine
Attorney, Agent, or Firm—Armstrong, Nikaido, Marmelstein, Kubovcik & Murray

[57] ABSTRACT

An improved electrolytic system for treating aqueous solution which passes the solution along an inner helical insulator wrapped around a centrally located anode solid rod and an enclosing inner cathode tube, then along a cathode tube wrapped or spaced with another helical insulator and an enclosing outer anode tube. The solid rod can be replaced with an innermost tube in order for the solution to initially pass through a cathode portion of the system. Also, the innermost cathode tube can have a plurality of apertures as passageways for the solution. A DC voltage is applied, in one direction or in sequential fields of different directions across the plurality of metal rods and tubes, thereby effectively removing both suspended materials and dissolved solids from the aqueous solution to be treated. The power supply required from the DC voltage can be decreased by treating specified tubes or rods. Various materials may be removed from waste water, either with the improved apparatus and method of the new apparatus of this invention or with the Liggett device, including removal of organics, or rendering plant fats, colloids, salts or the recovery of certain metals including gold.

48 Claims, 3 Drawing Sheets

ELECTROLYTIC TREATMENT OF LIQUIDS

This application is a continuation-in-part of application Ser. No. 074,680, filed July. 17, 1987, now abandoned, which is a continuation-in-part of application Ser. No. 059,998, filed June 9, 1987, now abandoned.

BACKGROUND OF THE INVENTION

This invention relates to the electrolytic treatment of liquids and, more particularly, this invention relates to an improved system for electrolytically treating aqueous solutions by causing dissolved solids to precipitate out of the solution.

Electrochemical flocculation of impure aqueous solutions has been known for many years, but no practical and economical method of treating large volumes of effluent has heretofore been found. With ever increasing standards of effluent purity being imposed on processing, industrial, and sewage treatment facilities, there is a strong need for an economical method of removing dissolved and other impurities from waste water, streams, or the like.

This problem has been recognized and a solution has been provided, especially for the removal of colloidal particles, by providing a spiraling insulating member wrapped around a cathode tube within an anode tube, as in Liggett, U.S. Pat. Nos. 4,293,400 and 4,378,276.

However, in U.S. Pat. Nos. 4,293,400 and 4,378,276, aqueous solution containing dissolved solids passes through the cathode tubes without any provisions for maximizing liquid contact with the internal surface of the cathode tubes. Further, a plurality of anode and cathode tubes are needed in most cases for effective electrolytic treatment. This drastically increases the cost of treatment, especially for anion and cation removal. Structural features which further decrease the efficiency and increase the cost of the electrolytic treatment apparatus of U.S. Pat. Nos. 4,293,400 and 4,378,276 include the length of housing from which the outlet extends and the inlet manifold which do not contribute to the actual removal of dissolved anions and cations from the anode and cathode tubes.

Accordingly, there is a need for an efficient, economical, simply constructed and easily installed improved system for electrolytic treatment of water for maximizing liquid contact with the anode and cathode metal surfaces, as well as minimizing the number of treatment tubes required for a much improved efficiency. Further, the above-described shortcomings of the prior art eliminated by minimizing the required power for efficient operation and allowing the solution to travel from one tube to another when exposed to sequential electrical fields of different directions.

With the foregoing background of the invention in mind, and as the following description of the invention proceeds, it will be appreciated that the primary object of the present invention is to provide an improved system for electrolytic treatment of liquids, including aqueous solutions, which is free of the aforementioned and other such disadvantages.

It is another primary object of the invention to provide an improved system for electrolytic treatment of liquids which avoids the inadequacies of the prior art.

It is a further object of the present invention to provide an improved system for electrolytic treatment of liquids which maximizes liquid contact with the anode and cathode metal surfaces inherent in the structure of the invention.

It is another primary object of the invention to provide an improved system for electrolytic treatment of liquids which has at least one solid centrally located metallic rod partially wrapped with an inner helical insulator or spacer and enclosed within an inner metal tube which is in turn partially wrapped with an outer helical insulator or spacer and enclosed within an outer metal tube for forming the path of the liquid solution to be treated.

It is another primary object of the invention to provide an improved system for electrolytic treatment of liquids which has at least one innermost metallic tube partially wrapped with an inner helical insulator or spacer and enclosed within an inner metal tube which is in turn partially wrapped with an outer helical insulator or spacer and enclosed within an outer metallic tube for forming the path of the aqueous solution to be treated.

It is another primary object of the invention to provide an improved system for electrolytic treatment of liquids which has at least one innermost metal tube with a plurality of liquid passage apertures passing therethrough, partially wrapped with an inner helical insulator or spacer and enclosed within an inner metal tube which is in turn partially wrapped with an outer helical insulator or spacer and enclosed within an outer metal tube for forming the path of the aqueous solution to be treated.

It is still another object of the invention to provide an improved system for electrolytic treatment of liquid which applies a DC voltage across the just describes plurality of rods and tubes which act either as cathodes or anodes.

It is yet another object of the present invention to provide an improved system for electrolytic treatment of liquid which applies sequential electric fields of different directions to the plurality of rods and tubes just described.

It is yet another object of the instant invention to provide an improved system for electrolytic treatment of liquids which treats specified rods or tubes for increasing their lives and for decreasing the power supply from the DC voltage source.

It is yet another object of the present invention to provide methods for treatment of various liquid sources in accordance with the apparatus of the invention, as well as in accordance with apparatus of the aforementioned patents to Liggett, U.S. Pat. Nos. 4,293,400 and 4,378,276.

SUMMARY OF THE INVENTION

In a first aspect of the present invention there is provided an electrolytic treatment apparatus for water, comprising:

a centrally located elongated member;

an inner insulator means for wrapping around said centrally located elongated member;

an inner tube for enclosing said inner insulator means;

an outer insulator means for wrapping around said inner tube;

an outer tube for enclosing said outer insulator means;

a housing means having inlet and outlet portions; and a voltage source means for connecting one terminal to said centrally located elongated member and said outer tube, and for connecting another terminal to said inner tube.

In an embodiment of said electrolytic treatment apparatus, said centrally located member is solid. In a further refinement, said centrally located member is tubular. The tubular centrally located member has a plurality of apertures passing therethrough in a further aspect of the invention. In another aspect, said centrally located member and said outer tube are made of materials which act as anodes, and wherein said inner tube is made of material which act as a cathode. In a preferred embodiment, said centrally located member and said outer tube are made of materials which act as cathodes, and wherein said inner tube is made of material which act as an anode.

In a further preferred embodiment of the electrolytic treatment apparatus constituting the first aspect of the invention, said centrally located member is made of a material which acts as cathode, and wherein said inner and outer tubes are made of materials which act as anodes.

In a further preferred embodiment of the electrolytic treatment apparatus constituting the first aspect of the invention said centrally located member is made of a material which acts as anode, and wherein said inner and outer tubes are made of materials which act as cathodes.

In a further preferred embodiment of the electrolytic treatment apparatus constituting the first aspect of the invention said centrally located member and said inner tube are made of materials which act as anodes, and wherein said outer tube is made of a material which acts as a cathode.

In a further preferred embodiment of the electrolytic treatment apparatus constituting the first aspect of the invention said centrally located member and said inner tube are made of materials which act as cathodes, and wherein said outer tube is made of a material which act as an anode.

In a further preferred embodiment of the electrolytic treatment apparatus constituting the first aspect of the invention, the apparatus further comprises spacers having different resistances for varying the voltage drops applied across portions of said centrally located elongated member and inner and outer tubes.

In a further preferred embodiment of the electrolytic treatment apparatus constituting the first aspect of the invention, the apparatus comprises pole reversal switch means for periodically reversing the polarity of said centrally located elongated member and inner and outer tubes.

In a further preferred embodiment of the electrolytic treatment apparatus constituting the first aspect of the invention, the apparatus further comprises means added within said tubes for increasing the reactivity area thereof.

In a further preferred embodiment of the electrolytic treatment apparatus constituting the first aspect of the invention, the apparatus further comprises means added to said liquids for producing metal ions for increasing efficiency of said electrolytic treatment apparatus.

In a second aspect of the invention, a method of purifying aqueous solutions is provided which comprises:

passing said aqueous solution along an inner insulator wrapped around a centrally located solid rod, wherein said aqueous solution is in contact with said centrally located solid rod and an inner tube;

passing said aqueous solution along an outer insulator wrapped around said inner tube, wherein said aqueous solution is in contact with said inner tube and an outer tube;

connecting one terminal of a DC voltage source to said solid rod and said outer tube;

connecting another terminal of said DC voltage source to said inner tube;

applying a voltage across said solid rod, and said inner and outer tubes from said DC voltage source; and thereafter removing suspended materials and dissolved solids from said aqueous solution.

In this method, a preferred embodiment provides passing said aqueous solution along said solid rod and said outer tube comprise the steps of passing said solution along a solid rod and an outer tube which are made of metals which act as anodes, and wherein said step of passing said solution along said inner tube comprises the step of passing said solution along an inner tube which is made of a metal which acts as a cathode.

In one embodiment, said steps of passing said aqueous solution along said solid rod and said outer tube comprise the steps of passing said solution along a solid rod and an outer tube which are made of metals which act as cathodes, and wherein said step of passing said solution along said inner tube comprises the step of passing said solution along an inner tube which is made of a metal which acts as an anode.

In an embodiment of the second aspect of the invention, there is provided a method of purifying aqueous solutions, comprising the steps of:

passing said aqueous solution along an innermost tube;

passing said aqueous solution along an inner insulator wrapped around said innermost tube, wherein said aqueous solution is in contact with said innermost tube and an inner tube;

passing said aqueous solution along an outer insulator wrapped around said inner tube, wherein said aqueous solution is in contact with said inner tube and an outer tube;

connecting one terminal of a DC voltage source to said innermost tube and said outer tube;

connecting another terminal of said DC voltage source to said inner tube;

applying a voltage across said innermost tube, said inner tube and said outer tube from said DC voltage source; and thereafter removing suspended materials and dissolved solids from said aqueous solution.

In accordance with this aspect, said step of passing said solution along said inner tube comprises the step of passing said solution along an inner tube which is made of a metal which acts as a cathode. In a further embodiment, said steps of passing said aqueous solution along said innermost tube and said outer tube comprise the steps of passing said solution along an innermost tube and an outer metal which are made of metals which act as cathodes, and wherein said step of passing said solution along said inner tube comprises the step of passing said solution along an inner tube which is made of a metal which acts as an anode.

In accordance with a preferred embodiment of the second aspect of the present invention, there is provided the further step of varying the step of applying a voltage.

In accordance with a preferred embodiment of the second aspect of the invention there is provided the additional step of reversing the polarity across the terminals of said DC voltage source.

In accordance with a preferred embodiment of the second aspect of the invention there is provided the further step of recycling sludge.

In accordance with a preferred embodiment of the second aspect of the invention there is provided the additional step of increasing the reactivity area of said tubes and rod.

In accordance with a preferred embodiment of the second aspect of the invention there is provided the further step of adding at least one substance to said aqueous solutions for producing metal ions.

In a further aspect of the invention there is provided a method for removing starch from an aqueous material, which comprises said aqueous material containing said starch through an electrolytic treatment apparatus for liquid, comprising:
a centrally located elongated member;
an inner insulator means for wrapping around said centrally located elongated member;
an inner tube for enclosing said inner insulator means:
an outer insulator means for wrapping around said inner tube;
an outer tube for enclosing said outer insulator means;
a housing means having inlet and outlet portions, whereby starch is recovered from said waste water.

In a further aspect, there is provided a method for removing rendering plant effluent fats from an aqueous material, which comprises said aqueous material containing said rendering plant effluent fats through an electrolytic treatment apparatus for water, comprising:
a centrally located elongated member;
an inner insulator means for wrapping around said centrally located elongated member;
an inner tube for enclosing said inner insulator means;
an outer insulator means for wrapping around said inner tube;
an outer tube for enclosing said outer insulator means;
a housing means having inlet and outlet portions, whereby rendering plant effluent fats is recovered from said waste water.

In a further aspect, there is provided a method for removing gold from an aqueous material, which comprises said aqueous material containing said gold through an electrolytic treatment apparatus for water, comprising:
a centrally located elongated member;
an inner insulator means for wrapping around said centrally located elongated member;
an inner tube for enclosing said inner insulator means;
an outer insulator means for wrapping around said inner tube;
an outer tube for enclosing said outer insulator means:
a housing means having inlet and outlet portions, whereby gold is recovered from said waste water.

The improved system for electrolytic treatment of water of the present invention is used to efficiently remove impurities from aqueous solutions, especially dissolved anions and cations by passing the aqueous solution through a plurality of metallic rods or tubes, which act either as positive anodes or negative cathodes and thereafter applying a DC voltage either in one direction or is sequential fields of different directions across the plurality of metallic rods or tubes thereby effectively removing both suspended materials and dissolved solids from the aqueous solution. In one embodiment, the aqueous solution to be treated enters an inlet and passes along the inner non-conductive helical insulator or spacer and along the outer surface of the center anode or cathode rod and the inner surface of the inner cathode or anode tube. The aqueous solution is then directed along the outer non-conductive helical insulator or spacer and along the outer surface of the inner tube and the inner surface of the anode or cathode outer tube. The aqueous solution thereafter passes through the discharge port wherein separation of the solids from the liquids occur. In another, the center anode or cathode rod can be replaced with an innermost anode or cathode tube. In yet another embodiment, the innermost anode or cathode tube has a plurality of apertures for the aqueous solution to pass therethrough. The above-described tubes in any desired combination can have similar types of apertures. The combination of metallic rods and tubes are enclosed in a tube housing in order to preclude leakage.

The foregoing and other objects, features and advantages of this invention will be apparent from the following, more particular, description of the preferred embodiments of this invention, as illustrated in the accompanying drawings.

DETAILED DESCRIPTION OF THE PREFERRED EMBODIMENTS

Figure 1:
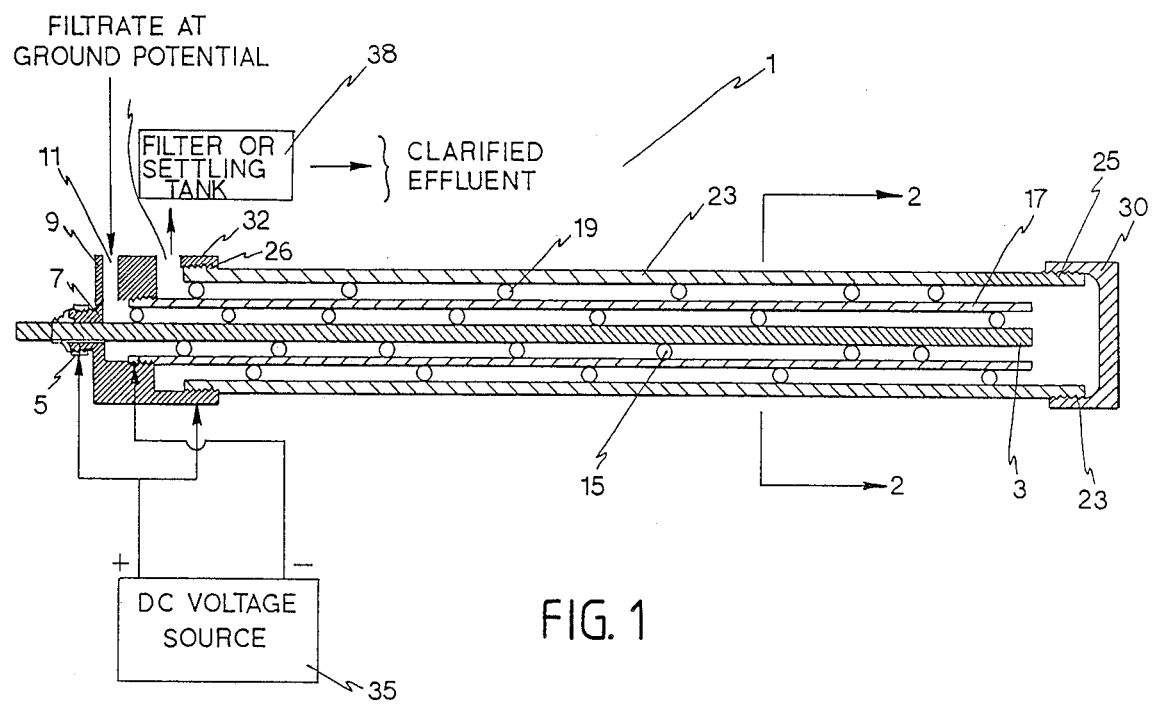
FIG. 1 is a cross-sectional view of the improved system for electrolytic treatment of liquid in accordance with the present invention having a center solid rod.

Attention is first directed to FIG. 1 which shows an improved system for electrolytic treatment of liquid generally referred by reference number 1. As shown in FIG. 1, a centrally located rod 3 has at least one end 5 held by a mounting member 7. The mounting member 7 has an extending portion 9 which makes up a part of an inlet portion 11. Wrapped around the rod 3 is an inner helical insulator or spacer 15 which is preferably cylindrical in cross-section or a closed tube so as to be compressible capable of providing a good seal with electrode surfaces against which they are pressed. An inner metal tube 17 encloses the rod 3 and the insulator or spacer 15, as shown. An outer helical insulator or spacer 19 wraps around the inner metal tube 17. An outer metal tube 23 encloses the outer helical insulator or spacer 15. Both ends of the outer metal tube 23 have external threads 25. 26 for mating with the internal threads 28 of an end cap 30 and internal threads 32 provided for the mounting member 7. Also, the inner metal tube 17 is coupled to the mounting member 7 with mating threads as shown. A housing tube (not shown), preferably made of plastic, is placed over the outer metal tube 23.

The center rod 3 is preferably made of metal which acts as an anode, such as aluminum, or the like. The inner tube 17 is preferably made out of metal which acts as a cathode, while the outer tube 23 is preferably made out of metal which acts as an anode. It should however be clear that the metals used for the rod 3 and tubes 17, 23 are not limited to the above-described materials. The rod 3 and tubes 17, 23 can be constructed of different metals or composites of materials. Similarly, the center rod 3 and the outer tube 23 can act as the cathode, while the inner tube 17 can act as the anode. Alternatively, the center rod 3 can be the cathode, while the inner 17 and outer 23 tubes can be the anode. Also, the center rod can be the cathode, while the inner 17 and outer 23 tubes can be the cathode. Another arrangement is to pair the center rod 3 and inner tube 17 as anodes and use the outer tube 23 as the cathode. Also, the center rod 3 and inner tube 17 can be paired as cathodes with the outer tube 23 a the anode.

A direct current voltage from a source 35 is applied across the metal rod 3 and tubes 17, 23. For example, the positive terminal of the DC voltage source 35 is connected to the center rod 3 and outer tube 23 when acting as the anode by way of pins (not shown) mounted through the mounting member 7. A variable inline resistor can be used to apply different voltages across the rod 3 and the tubes 17, 23 if voltage is supplied from the same source. Moreover, if different lengths of metal tubes or rod are used, insulators or spacers 15, 19 can have different resistance values between the tube sections so as to attain different voltages applied across various sections along the rod 3 and tubes 17, 23.

When in use, aqueous solution enters inlet portion 11. The non-conductive insulators or spacers 15, 19 which are wrapped around the center rod 3 and the inner tube 17, respectively, do not provide any gaps between it and the rod 3 and the surfaces of the tubes 17, 23. Thus, the aqueous solution winds along the helical passageways 41, 42 (shown in FIG. 2) provided by the insulators or spacers 15, 19 thereby maximizing the liquid contact with the metal surfaces of the rod 3 and tubes 17, 23. A discharge portion 36 is provided for discharging the treated liquid. The solids in the treated solution is separated from the liquid with a filter or by retaining it for a period of time in a settling tank or basin 38. The negative and positive poles of the System 1 can be periodically reversed, either mechanically or automatically, so as to aid in the cleaning of the cathode portion as will later be described.

The System just described significantly improves the efficiency of the electrocoagulation process since direct current causes the negative and positive elements towards each other. Further more liquid contact to the metals is achieved thereby further improving the efficiency of the treating process. Further, a strong, quick settling, low volume floc is generated. Also, less aluminum hydroxide floc is formed when compared with the conventional adding of aluminum to waste water, thus less floc is required to be disposed of. Other divalent and trivalent metal ions (e.g., nickel) are removed in the process since the positive ions are directed by the electrical current into the negative hydroxide ions. The formation of metal hydroxide sludge (e.g., iron hydroxide) i s advantageous in that the metal hydroxide sludge or precipitate is not hazardous per se. Thus, the final form of the sludge or precipitate is suitable for dumping or storage.

In addition to the formation of metal hydroxide sludge, the electrocoagulation system of the instant invention has been observed to form metal oxides and complex metal oxide sludge or precipitate. The just-mentioned metal oxides are stable in acid solutions. Thus, the formation of sludge or precipitate in the form of metal oxides or complex metal oxides is advantageous in that they can be safely dumped or stored. Oxides of this type can, for example, be of iron, nickel, aluminum, chromium, or the like.

It has been observed that, for instance, a solution containing nickel at 11.2 mg/L has been treated using an iron anode and cathode at 20 amperes and 23 volts. The solution (supernatant) had a nickel concentration of 1.47 mg/L. The formed sludge or precipitate after treatment contained an iron-nickel-oxide having 3.1% nickel on a dry weight basis.

A complexing agent had also been added to the solution prior to undergoing an electrocoagulation process. However, the complexing agent without electrocoagulation was observed to only lower the nickel level to 3.8 mg/L. It was further observed that solutions having undergone an electrocoagulation process without the use of a complexing agent had a nickel level of 1.45 mg/L.

Organic compounds can be directly destroyed at the anode. When oxygen is present in the aqueous solution, ozone, for example, which forms at the anode can react with and destroy organic compounds in the solution. Hydrogen gas bubbles can form at the cathode which float the formed waste floc to the surface of the solution wherein they can be skimmed off.

As described above and illustrated in FIG. 1, the System 1 is economical since it requires only one cathode tube and requires less power for effective operation. For example, given the following structural parameters:
    an iron rod (anode) with 0.25 inch diameter
    a 0.25 inch thick iron inner tube with a 0.75 inch inside diameter
    an aluminum outer tube with 1.50 inch inner diameter,
the conductivity of the aqueous solution or waste water was found to be 500 micro mhos per centimeter and the treatment process required 120 watts of power. Further, the treatment process removes 8.30 micro mhos of conductivity per watt of power. When the central rod was removed, 5.50 micro mhos per centimeter of conductivity per watt of power was removed and the conductivity was lowered only to 1000 micro mhos per centimeter. When the same solution was treated with just the center rod removed and then treated again with the center rod removed and the outer tube replaced with a 1.50 inch inside diameter iron tube, the solution which was twice treated, had a conductivity of 600 micro mhos per centimeter and 4.70 micro mhos of conductivity per watt of power was removed. Thus, the above-described system (FIG. 1) removes more salts from the water, as measured in terms of conductivity, as well as required only about 40% of energy per amount of salt removed.

Also, sequential electric fields of different directions can be applied to the solution resulting in a much improved efficiency for the process. For example, efficiency can be increased by reversing the anodes and cathodes; i.e., having the center rod 3 and the outer tube serve as cathodes while the inner tube 17 serves as the anode.

Figure 2:
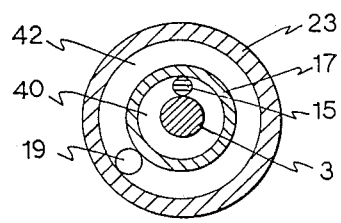
FIG. 2 is a cross-sectional view taken along line 2—2 of FIG. 1 showing the manner in which the rods and tubes are arranged for directing and treating an associated aqueous solution.
Figure 3:
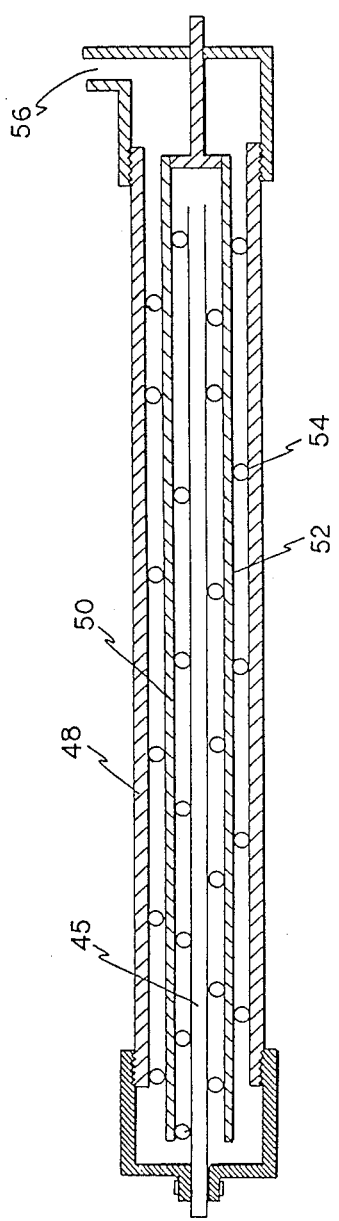
FIG. 3 is another embodiment of the improved system for electrolytic treatment of liquid shown in cross-sectional view having a center tube.

As shown in FIG. 3, the aqueous solution can be initially exposed to the cathode by having the center rod 3 in FIGS. 1 and 2 replaced with an innermost tube 45 having a material which acts as a cathode. The outer tube 48 similarly acts as a cathode, while the inner tube 50 acts as the anode. Other combinations can be provided, such as having the innermost tube 45 act as the cathode while the outer 48 and inner 50 tubes act as the anodes. Also, the innermost tube 45 can be the anode, while the inner 50 and outer 48 tubes can be the cathode. Another arrangement is to pair the innermost tube 45 and inner tube 50 as anodes and use the outer tube 48 as the cathode. Also, the innermost tube 45 and inner tube 50 can be paired as cathodes with the outer tube 48 as the anode. In FIG. 3, the aqueous solution enters the innermost tube 45 and passes through an inner helical insulator or spacer 52, as above described for FIG. 1, within the inner tube 50. The solution then passes through an outer helical insulator or spacer 54 within the outer tube 54 and exits through outlet portion.

A metal rod (not shown) can be inserted inside the innermost tube 45 so that the system, illustrated in FIG. 2, comprises at least three metal tubes 25, 48, 50 and the metal rod. Other arrangements are possible, including having four metal tubes, four metal tubes with a metal rod, five metal tubes, five metal tubes with a metal rod, or the like. As described for FIG. 1, FIG. 2 can similarly have different combinations of arrangements for the anodes and cathodes, as well as different metals or composites of metals. The various rods and tubes may also vary in sizes and lengths.

Figure 4:
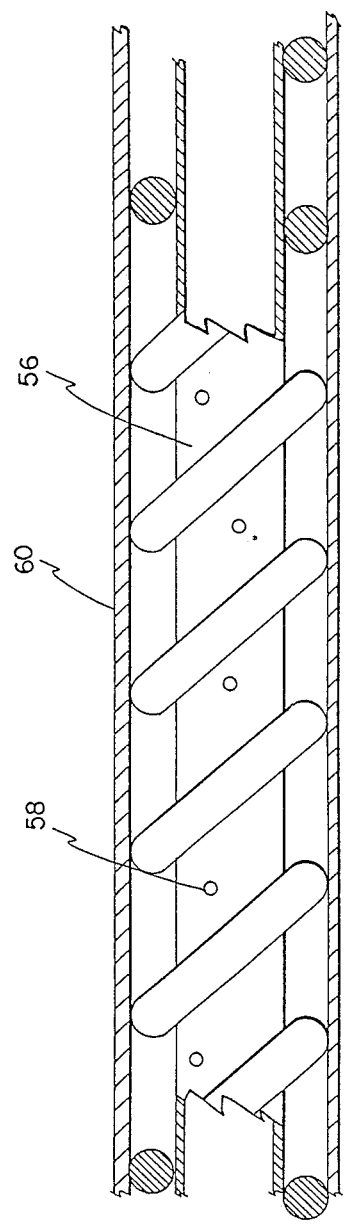
FIG. 4 is yet another embodiment of the improved system for electrolytic treatment of liquid shown in cross-sectional view having the center tube with a plurality of apertures passing therethrough.

In FIG. 4, an innermost tube 56 can have a plurality of apertures 58 passing therethrough in order to allow varying amounts of solution to pass into the inner tube 60 which increases the electrocoagulation treatment of some solutions especially when exposed to sequential electric fields of different directions.

Figure 5:
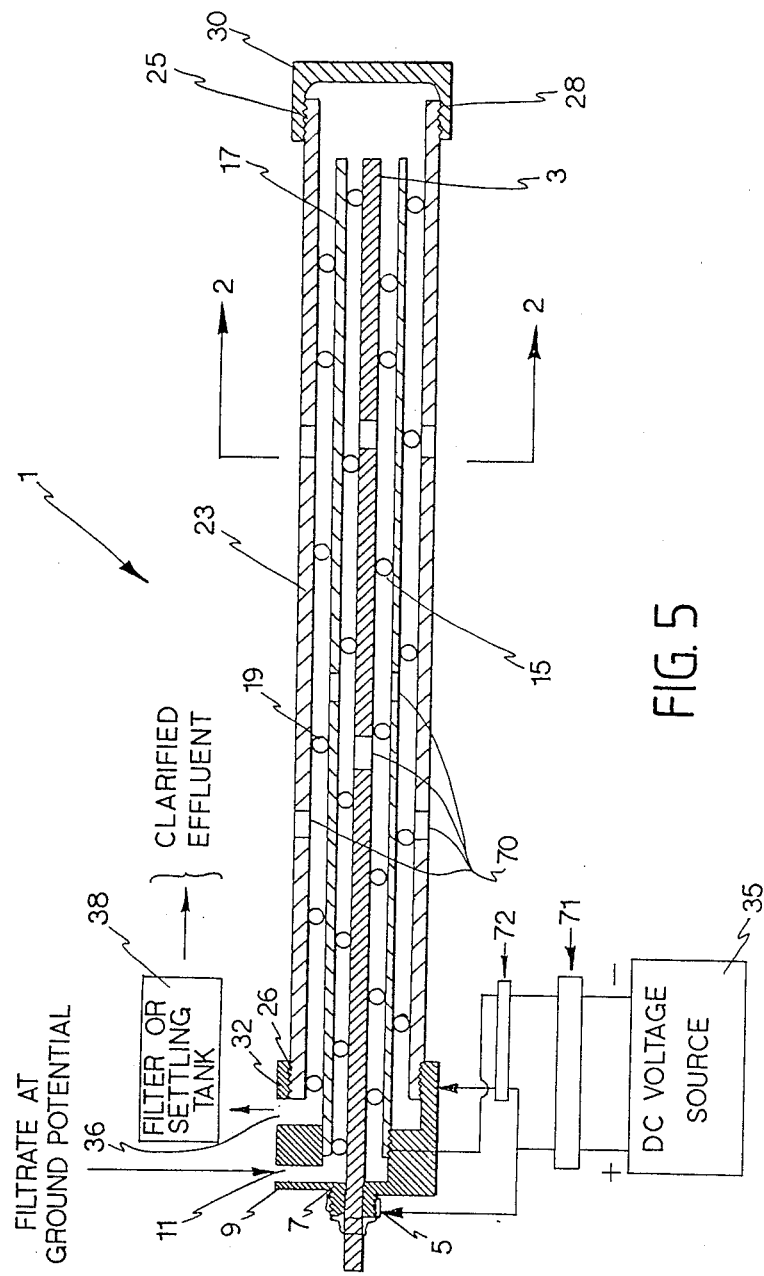
FIG. 5 is yet another embodiment of the improved system for electrolytic treatment of liquid illustrating the manner in which spacers and pole reversal switches are coupled at various locations of the plurality of tubes.

As shown in FIG. 5, spacers 70 may be coupled to the center rod 3, and the inner 17 and outer 23 tubes. The spacers 70 can, for example, be in the form of rings or tubes having external or internal threaded ends for mating with internal or external threaded end portions (not shown) of the center rod, and the inner 17 and outer 23 tubes. The spacers 70 can, for example, be made of PVC, or semi-conductive material, or the like. The spacers 70, having different resistances are used for varying the voltages applied at various sections of the center rod 3, and the inner 17 and the outer 23 tubes when the System 1 is in use.

As further shown in FIG. 5, pole reversal switches 71,72 are alternatively coupled to the wires leading to the terminals of the DC voltage source 35. The pole reversal switches 71,72 are, for example, of the types manufactured by Rapid Power Technologies, Inc. of Brookfield, Conn. The pole reversal switches 71,72 are used to aid in the cleaning of the cathode by having the negative and positive poles of the System 1 periodically reversed.

The above-described electrolytic system can be improved by adding materials to the solution to be treated. Such materials include acids, bases, polymers, fly ashes, peat mosses, ozone, potassium permanganate, alum, iron chloride, iron hydroxide, calcium chloride, silica, magnesium salts, iron oxide, alumina, air, oxygen, or the like.

It has been unexpectedly observed that adding certain materials to a solution before undergoing electrocoagulation treatment increases the removal of impurities from the liquid. In essence, the added materials can change the nature of the sludge or precipitate formed by the electrocoagulation process. Moreover, the added materials can change the nature of the interacting impurities and the mechanism by which the impurities are removed.

In some instances, sludge formed by the electrocoagulation process can be acidified (e.g., by adding hydrochloric acid, or the like into the liquid or aqueous solution) thereby allowing the sludge to release metal ions which is introduced into the liquid or aqueous solution. The introduction of metal ions by the sludge effectively substitutes for the metal ions from the anode portion. Thus, the system can be operated at less current or voltage, thereby allowing the anode portion to be long lasting. The metal ions can also essentially remove impurities from the liquid or aqueous solution being treated.

If the sludge is recycled through the system, the sludge generally acts as a "seed" to form new or more dense sludge by the process of nucleation, thus, the metal ions which are further produced by this process increases the efficiency of the system in its removal of impurities from the liquid or aqueous solution being treated. In essence, the added sludge acts as a nucleation site in the nucleation process.

Materials (such as, carbon, or the like) can be provided within the annular spacings (e.g., the hollow portion of the tubes) in order to increase the reactivity area and thus, the efficiency, of the system. The material to be used can, e.g., be carbon chips or balls. Examples of carbon chips or balls to be used include: Union Carbide electrolytic carbon; "PGH-BPL" ( a bituminous base activated carbon provided by granules of $6 \times 16$ mesh) manufactured by Pittsburgh Activated Carbon Co. of Pittsburgh, Penn.; "NUCHAR WV-W" (a coal based activated carbon) manufactured by West Virginia Paper and Pulp Co., W.V.; and Witco-256 or Witco-337 manufactured by Witco Chemicals of New York City, N.Y.

In order to decrease the power supply from the DC voltage source across the tubes, as well as to increase the lives of the various tubes, the tubes can be coated, sprayed, painted, dipped or wrapped with a material which inhibits the particles directed toward the treated tube (acting either as an anode or a cathode) to the flow of particles from an untreated tube (acting either as a cathode or an anode, respectively). The treatment material can be epoxy (e.g., "COAL-TAR" epoxy) or polyurethane spray, latex dipping fluid, or any material thin enough to permit current density to pass through.

Since the treatment material tends to insulate the tube, the amperage per volt which passes through the liquid decreases. Thus, an operator can pass higher voltage and less amperage through the liquid.

In an untreated tube in an environment of low voltage and high amperage, the flocculation occurs due to the quantity of metallic ions in spite of the ionic velocities at lower rates. Under the influence of an applied electric field, ions tend to accelerate in a direction opposite to the electric field. Thus, the increase in voltage or applied electric field results in a net effect of more collisions in the liquid between pollutant particles, metallic ions and OH or hydroxyl ions which, in some instances, may provide better flocculation.

In a two-tube configuration having a treated inner cathode tube (i.e., the outer surface of the inner cathode tube being treated), the following results were observed:

| Tube Type | Voltage | Amperage | Power |
|---|---|---|---|
| Regular | 50 volts | 28 amps | 1400 watts |
| Treated | 150 volts | 3 amps | 450 watts |

Therefore, a treated tube can be a significant advantage in a conductive influent as power is decreased due to the lowering of amperage, thereby significantly increasing the tube life.

It has further been observed that in a treated "negative sight" or a cathode tube, hydrogen gas forms between the tube and the treatment material. However, in a treated "positive sight" or an anode tube, significant improvement in the deterioration rate of the tube has been observed.

The following examples illustrate the use of the aqueous treatment with either the patents of Liggett, U.S. Pat. Nos. 4,293,400 and 4,378,276, or the present invention.

EXAMPLE I

Using the apparatus of the Liggett patents, potato waste water was treated with the following results:

| Wastewater | Concentration (mg/L) | | |
|---|---|---|---|
| | TSS | BOD | Oil & Grease |
| Raw (after hydroscreen) | 948 | 1,740 | <10 |
| Raw electrocoagulated supernatant | 30.7 | 330 | <20 |
| Raw, fly ash + electro-coagulation supernatant | 28.5 | 270 | <10 |

The electrocoagulation treatment consisted of processing the wastewater using first an iron tube, and then with an aluminum tube. The double treatment was necessary because the wastewater was still turbid after treatment with just the iron tube. After the double treatment a very clear water was obtained.

The quality of the water obtained by the double treatment was basically the same as that obtained by the fly ash addition followed by a single electrocoagulation in the iron tube. The fly ash used in the treatment was from a midwestern power plant burning sub-bituminous coal.

Treatment of the potato wastewater by iron-/aluminum electrocoagulation or by fly ash addition/iron electrocoagulation both reduced the suspended solids and BOD by approximately 82% and 97%, respectively.

The foregoing example is representative of the treatment of an organic-containing waste water.

EXAMPLE II

Further potato waste water tests were conducted:

The organic load was determined by different methods in the two studies. Biochemical oxygen demand (BOD) was used for the raw wastewaters in both studies and for the treated waters in the first study. However because of the large number of samples and the quick turnaround required, the organic load of the treated wastewaters in the second study was measured using total organic carbon (TOC). While both tests measure organic carbon they do so in different ways and with different values. Although a decrease in TOC levels indicates a decrease in 800 levels, the TOCs listed in the second study should not be compared directly with the BODs listed in the first study. The results of the second study are as follows:

1. The TOC of the before-hydroscreening wastewater was reduced 83% by the addition of Coors' stokee fly ash. Because the fly ash did not entirely settle out after several hours electrocoagulation was used to remove it.
2. Electrocoagulation treatments reduced the total suspended solids (TSS) level by 73 to 99 percent. The best TSS removal, as in the first study, was achieved with the iron tube in sequence with the aluminum tube.
3. Electrocoagulation reduced TOC in the before-hydroscreening wastewater by up to 63 percent. The best tube arrangement was an iron tube in sequence with an aluminum tube. Although the reduction of 63% was less than the 82% reflected in the first study. the first study was conducted on the wastewater after hydroscreening. The wastewater after hydroscreening had a higher pH and was therefore more treatable.
4. The use of stokee fly ash followed by iron-tube electrocoagulation removed 99% and 78% of the TSS and TOC respectively. These results compare with those from the first study in which commercial fly ash followed by iron-tube electrocoagulation achieved a 97% and 85% removal of the TSS and BOD, respectively.

The data are listed in the Table below.

| | pH | TOC mg/l | BOD mg/L | TSS mg/L | % Removal of TOC | % Removal of TSS |
|---|---|---|---|---|---|---|
| Percent Removal of TSS and TOC from Potato Wastewater Before and After Different Treatments | | | | | | |
| Wastewater Before Hydroscreening | | | | | | |
| Raw untreated | 6.3 | 759 | 1970 | 4610 | | |
| Supernatant from Elc[s] | 6.3 | 540 | 1400[d] | 88 | 29 | 98 |
| Supernatant from Elc[s] | 8.0 | 561 | 1450[d] | 72 | 26 | 98 |
| Supernatant from Elc[s] | 9.5 | 551 | 1425[d] | 208 | 27 | 95 |
| Supernatant from Fly ash #1[b] | 7.6 | 410 | 1050[d] | | 46 | |
| Supernatant from Fly ash #2[c] | 7.8 | 130 | 325[d] | | 83 | |
| Supernatant from fly ash #1 + Elc[i] | 7.6 | 210 | 550[d] | 47 | 72 | 99 |
| Supernatant from fly ash #2 + Elc[i] | 7.8 | 170 | 450[d] | 48 | 78 | 99 |
| Supernatant from Elc[ia] | 6.3 | 280 | 725[d] | 27 | 63 | 99 |
| Wastewater After Hydroscreening | | | | | | |
| Raw untreated | 7.1 | 801 | 2040 | 764 | | |

Percent Removal of TSS and TOC from Potato Wastewater Before and After Different Treatments

| | pH | TOC mg/l | BOD mg/L | TSS mg/L | % Removal of TOC | % Removal of TSS |
|---|---|---|---|---|---|---|
| Supernatant from Elc[a] | 7.1 | | | 140 | | 82 |
| Supernatant from Elc[a] | 8.0 | | | 28 | | 96 |
| Supernatant from Elc[a] | 9.5 | | | 208 | | 73 |
| Supernatant from Elc[i] | 7.1 | 449 | 1150[d] | 84 | 44 | 89 |
| Supernatant from Elc[i] | 8.0 | 356 | 900[d] | 28 | 56 | 96 |
| Supernatant from Elc[i] | 9.5 | 349 | 900[d] | 32 | 56 | 96 |
| Wastewater Discharged to Sewer | | | | | | |
| Raw, untreated | | 701 | 1170 | 1254 | | |

[a] Electrocoagulated using an aluminum tube
[b] 1% solution of fly ash 2 × 10 #87-8 (40), 2-2-87 @ 1939
[c] 1% solution of fly ash stokee #829, 2-2-87
[d] Calculated value, determined from the ratio of the BOD/TOC of the same wastewater
[i] Electrocoagulated using an iron tube
[ia] Electrocoagulated using an iron tube and an aluminum tube in sequence
[s] Electrocoagulated using a stainless steel tube

EXAMPLE III

Rendering plant waste water is treated with the Liggett apparatus:

Percent Removal of TSS and TOC by electrocoagulation of Rendering Wastewaters

Effluent from Tricellation Unit ("BACK" Sample)

| | mg/L | | % Removal | |
|---|---|---|---|---|
| | TSS | TOC | TSS | TOC |
| Raw sample | 1100 | 4300 | | |
| Fe-Al electrocoagulation | 99 | 1200 | 91 | 72 |
| Al electrocoagulation | 497 | 1600 | 54 | 63 |
| Fe electrocoagulation | 844 | 2000 | 23 | 54 |
| Cu electrocoagulation | 1214 | 800 | −10 | 81 |

Influent to Skimmer Tank - ("INSIDE" sample)

| | TOC (mg/L) | % Removal of TOC |
|---|---|---|
| Raw Sample | 7080 | |
| Fe-Al electrocoagulation | 4270 | 40 |
| Cu electrocoagulation | 4640 | 35 |
| Fe electrocoagulation | 4830 | 32 |
| SS electrocoagulation | 5060 | 29 |
| Al-Cu electrocoagulation | 5180 | 27 |

1. The wastewater could be electrocoagulated before the skimmer tank, reducing the loading to the tricellation unit by 40%.
2. The wastewater could be electrocoagulated again after the tricellation unit. This double treatment used with the tricellation unit could yield total TOC+TSS reductions of 85 to 95%.
3. The material removed by electrocoagulation may be marketable, thus changing a liability to an asset.

EXAMPLES IV–XIII

Recovery of various metals is considered with Liggett apparatus in the following examples:

The concentrations of the ten metal ions, reduced approximately 50% or more by iron-tube electrocoagulation at pH=7, are listed in Table 1 below. As can be seen, the removal of six of the ten heavy metals is 94% or greater.

Metal Concentrations in the Argo Mine Water and the Percentage Reductions in These Concentrations Before and After Iron-Tube Electrocoagulation at a pH of 7.0.

| Metal | Raw Water Metal Concentration (mg/L) | Metal Concentration in Supernatant After Treatment (mg/L) | Removal (%) |
|---|---|---|---|
| Aluminum[a] | 21.2 | <.05 | >99.7 |
| Zinc[a] | 38.5 | 0.11 | 99.7 |
| Copper | 5.1 | 0.025 | 99.5 |
| Silicon | 16.0 | <0.1 | >99 |
| Iron | 138 | 7.49 | 95 |
| Nickel | 0.221 | 0.014 | 94 |
| Manganese[a] | 82.7 | 6.96 | 76 |
| Magnesium[a] | 93.9 | 46.54 | 50 |
| Silver | 0.022 | 0.011 | 50 |
| Lead | 0.115 | <0.06 | >48 |

[a] Values should be used with reservation, since quality assurance standards were not run for these elements.

Some heavy metals can be removed by up to 90% by adjusting the pH of the water. This is shown in Table 2, under treatment I. However, if the pH adjustment is followed by electrocoagulation, the removal of the heavy metals can be improved by as much as 74% in some cases. This is shown in Table 2, under treatment III (stainless-steel-tube electrocoagulation) and treatment IV (iron-tube electrocoagulation). Electrocoagulation doesn't work as well for heavy metal removal at low pH levels. This can be seen in Table 2 by comparing the results of treatment II (stainless-steel-tube electrocoagulation at a pH=2.7) with the results of treatment III a (stainless-steel-tube electrocoagulation at pH.=7). The exceptions to this rule may be silver and calcium. It can also be seen in Table 2 that stainless-steel electrocoagulation, especially under low pH conditions (treatment II), tends to release chromium and nickel into the water.

Metal Concentrations in the Argo Mine Water and the Percentage Reductions of These Concentrations After Different Treatments

| Metal | Raw Water I[a] Concentration (mg/L) | Raw Water II[b] Concentration (mg/L) | Treatment I[c] Removal (%) | Treatment II[d] Removal (%) | Treatment III[e] Removal (%) | Treatment IV[f] Removal (%) |
|---|---|---|---|---|---|---|
| Aluminum[g] | 22.9 | 21.2 | 90 | 10 | >99.7 | >99.7 |
| Copper | 5.44 | 5.10 | 90 | 0 | 99.5 | 99.5 |
| Iron | 151 | 138 | 90 | 29 | 99.6 | 95 |
| Zinc[g] | 45.6 | 38.5 | 58 | 16 | 99.8 | 99.7 |

-continued

Metal Concentrations in the Argo Mine Water and the Percentage Reductions of These Concentrations After Different Treatments

| Metal | Raw Water I[a] Concentration (mg/L) | Raw Water II[b] Concentration (mg/L) | Treatment I[c] Removal (%) | Treatment II[d] Removal (%) | Treatment III[e] Removal (%) | Treatment IV[f] Removal (%) |
|---|---|---|---|---|---|---|
| Silicon | 21.7 | 16.0 | 55 | 0 | 94 | 99 |
| Manganese[g] | 92.9 | 82.7 | 0 | 26 | 74 | 76 |
| Nickel | 0.223 | 0.221 | 11 | −6200[h] | −340[h] | 94 |
| Lead | 0.258 | 0.115 | 17 | −310[h] | 45 | >48 |
| Magnesium[g] | 98.5 | 93.9 | −26 | 12 | 20 | 50 |
| Strontium[g] | 1.445 | 1.40 | −21 | 7 | 24 | 7 |
| Vanadium[g] | 0.035 | 0.025 | −24 | 0 | 0 | 36 |
| Calcium | 299 | 295 | −35 | 25 | 12 | 11 |
| Silver | 0.030 | 0.022 | 0 | 50 | 18 | 50 |
| Platinum[i] | 0.2 | 0.2 | | | | |
| Gold[j] | <0.1 | <0.1 | | | | |
| Chromium | 0.014 | 0.019 | 42 | −160,000[h] | −110[h] | −150[h] |

[a]Raw water from the Argo Mine, pH = 2.7, non-digested, analyzed for dissolved metals.
[b]Raw water subjected to USEPA standard digestion for analysis of total metals.
[c]Supernatant after precipitation by pH adjustment from 2.7 to 7.0.
[d]Electrocoagulated supernatant after ten passes through a stainless steel tube, pH = 2.3 at 20 amp and 30 volts.
[e]Supernatant after pH adjustment to 7.0 and 10 passes through the stainless steel electrocoagulation tube.
[f]Supernatant after pH adjustment to 7.0 and 10 passes through the iron electrocoagulation tube.
[g]Values are estimates only since quality assurance standards were not run for these elements.
[h]Negative values indicate an increase in the element concentration after treatment.
[i]Present only at the limit of detection; therefore % removals cannot be determined.
[j]Below the limit of detection.

1. Four of the fourteen heavy metals present in the water can be successfully removed (99+% reduction) by adjusting the pH to 7 and using iron-tube electrocoagulation (treatmant IV). These metals are copper, iron aluminum, and zinc. The metal concentrations of ten of the fourteen metals present can be reduced by approximately 50% or more using iron-tube electrocoagulation at a pH of 7.
2. pH adjustment alone reduced the concentrations of eight metals three by 90% (treatment I). However, pH adjustment followed by iron-tube electrocoagulation reduced the concentration of thirteen metal ions four of them by 99% or more (treatment IV).
3. Removal of heavy metals using electrocoagulation is most successful at higher pH levels with perhaps the exception of calcium and silver. For example, the concentrations of eight metals were reduced by electrocoagulation at a pH of 2.7 (treatment II); however. the same electrocoagulation process at a pH of 7 reduced the concentration of eleven metals (treatment III). Not only are more metal ions removed, but the amount removed also increases, in some cases as much as 99.5%.
4. The use of stainless-steel tubes releases nickel and chromium into the water especially under acid conditions (treatment II).

EXAMPLES XIV-XXV

Recovery of various metals and other materials are further considered in the same manner as the previous examples in the following examples:

Concentrations (mg/L) of Selected Contaminants in Various Wastewaters 8efore and After Electrocoagulation

| Contaminant | Before Treatment | After Treatment | % Removal |
|---|---|---|---|
| Cadmium ion | 31.0 | .338 | 99 |
| | 3.0 | <.005 | 99.8 |
| | .3 | .006 | 98 |
| Chromium total | 14.9 | .080 | 99.5 |
| | 5.0 | <.050 | 99+ |
| | 1.8 | .090 | 95 |

-continued

Concentrations (mg/L) of Selected Contaminants in Various Wastewaters 8efore and After Electrocoagulation

| Contaminant | Before Treatment | After Treatment | % Removal |
|---|---|---|---|
| Zinc ion | 95.0 | .710 | 99.3 |
| | 3.3 | .050 | 98 |
| | 1.4 | .040 | 97 |
| Copper ion | 17.6 | .25 | 98.5 |
| | 7.6 | .220 | 97 |
| Nickel ion | 7.6 | .250 | 97 |
| Cyanide, total | 25.1 | .98 | 96.1 |
| Sulfate ion | 1100 | 740 | 33 |
| Phosphate ion | 4.0 | <.4 | .90+ |
| Total organic carbon | 2253 | 30.1 | 98.6 |
| Silica | 83 | 1.7 | 98 |
| Total suspended solids | 1278 | 2.0 | 99.8 |
| Oil and grease | 1100 | <10 | 99+ |

EXAMPLE XXVI

Gold is recovered from an aqueous mixture by passing the gold-containing aqueous mixture through the system of the instant invention.

Removal of Gold and Platinum from an Aqueous Solution Using the James Liggett Electrocoagulation Process.

| Metal | Concentration (mg/L) Before Treatment | Concentration (mg/L) After Treatment | % Removal |
|---|---|---|---|
| Gold | 5.72 | 1.38 | 75 |
| Platinum | 4.40 | .68 | 85 |

The electrocoagulation process first treated the water using a one-inch diameter iron anode tube operated at 5 amperes and 120 volts. This was followed by treatment using a 1-inch diameter aluminum anode tube at 7 amperes and 120 volts While the invention has been particularly shown and described in reference to preferred embodiments thereof, it will be understood by those skilled in the art that changes in form and details may be made therein without departing from the spirit and scope of the invention.

EXAMPLE XXVII

Moreover, removal of various impurities, including cations, anions and other materials, from solutions have been unexpectedly observed using the electrocoagulation system in the following examples:

Concentrations of Selected Contaminants in Various Waters Before and After Coagulation

| Contaminant | Wastewater Source | Concentration (mg/L) Raw | After Treatment | % Removal |
|---|---|---|---|---|
| Dissolved Cations | | | | |
| Arsenic | Acid drainage | 0.159 | <.10 | 37+ |
| Aluminum | Can mfg | 317 | 53 | 83 |
| | Can mfg | 224 | 0.693 | 99.7 |
| | Syn fuel | 0.20 | <.05 | 75+ |
| Barium | River | 0.17 | <.01 | 94+ |
| Calcium | Cooling tower | 1321 | 21.4 | 98 |
| | Canal | 202 | 63.4 | 67 |
| | River | 42.8 | 21.9 | 49 |
| | Syn fuel | 6.41 | 1.96 | 69 |
| Cadmium | Electroplating | 31.0 | 0.338 | 99 |
| | Electroplating | 12.0 | 0.057 | 99.5 |
| | Electroplating | 3.0 | <.005 | 99.8+ |
| | Electroplating | 0.3 | 0.006 | 98 |
| Chromium, total | Electroplating | 14.9 | 0.080 | 99.5 |
| | Electroplating | 5.0 | <.050 | 99+ |
| | Electroplating | 1.8 | 0.090 | 95 |
| | Can mfg | 1.02 | <.02 | 98+ |
| Copper | Electroplating | 287 | 0.484 | 99.8 |
| | Electroplating | 17.6 | 0.25 | 98.5 |
| | Electroplating | 7.6 | 0.22 | 97 |
| Iron | Acid drainage | 151 | 0.57 | 99+ |
| | Syn fuel | 1.15 | <.05 | 95+ |
| Lead | Acid drainage | .258 | <.06 | 76+ |
| Magnesium | Canal | 92.2 | 23.6 | 74 |
| | River | 12.0 | 8.3 | 31 |
| | Syn fuel | 4.85 | 1.28 | 74 |
| | Syn fuel | 1.68 | 0.28 | 83 |
| Manganese | Can plant | 3.37 | 0.56 | 83 |
| | Can plant | 2.40 | 0.39 | 84 |
| | Syn fuel | 0.035 | <.01 | 71+ |
| Nickel | Electroplating | 7.6 | 0.25 | 97 |
| Selenium | Drainage | 0.068 | 0.038 | 44 |
| Silicon | Syn fuel | 38 | 0.8 | 98 |
| | Acid drainage | 21.7 | <.1 | 99+ |
| | Syn fuel | 12.6 | 0.38 | 97 |
| | River | 3.98 | 0.63 | 84 |
| Strontium | Canal | 2.74 | 1.40 | 49 |
| Vanadium | Syn fuel | 0.034 | <.01 | 70+ |
| Zinc | Can mfg | 1.12 | <.02 | 98+ |
| | Foundry | 3.94 | 0.075 | 98 |
| | Acid drainage | 0.298 | <.01 | 96+ |
| Dissolved Anions | | | | |
| Cyanide, total | Electroplating | 25.1 | 0.98 | 96.1 |
| Nitrate | Groundwater | 14.7 | 7.3 | 50 |
| Fluoride | Can mfg | 64.0 | 28.0 | 56 |
| Sulfate | Oil brine | 1100 | 740 | 33 |
| Phosphate | City sewage | 4.0 | <.4 | 90+ |
| | Can plant | 2.5 | 0.63 | 75 |
| Other Dissolved and Suspended Material | | | | |
| Biochemical oxygen demand, BOD | Rendering | 5700 | 590 | 89 |
| | Potato processing | 1740 | 330 | 81 |
| | Brewery | 950 | 650 | 32 |
| | Fish processing | 185 | 86 | 53 |
| Oil and Grease | Rendering | 3052 | 150 | 95 |
| | Syn fuel | 1100 | <10 | 99+ |
| Total Organic Carbon (TOC) | Syn fuel | 6400 | 250 | 96 |
| | Syn fuel | 2253 | 30.1 | 98.6 |
| Total Suspended Solids (TSS) | processing | 88,900 | 1420 | 98 |
| | Syn fuel | 15,270 | 10 | 99+ |
| | Rendering | 4540 | 260 | 94 |
| | Syn fuel | 1278 | 2.0 | 99.8 |
| | Syn fuel | 310 | 0.8 | 99+ |
| | Potato processing | 93 | 0.8 | 99 |

While the invention has been particularly shown and described in reference to preferred embodiments thereof, it will be understood by those skilled in the art that changes in form and details may be made therein without departing from the spirit and scope of the invention.

What we claim is:

1. An electrolytic treatment apparatus for liquids, comprising:
    a centrally located elongated member for allowing said liquids to pass thereon;
    an inner insulator means for wrapping around said centrally located elongated member and for allowing said liquids to pass along the external surface thereof;
    an inner tube for enclosing said inner insulator means and for allowing said liquids to pass along the external and internal surfaces thereof;
    an outer insulator means for wrapping around said inner tube and for allowing said liquids to pass along the external surface thereof;
    an outer tube for enclosing said outer insulator means and for allowing said liquids to pass along the internal surface thereof;
    a housing means having inlet and outlet portions; and
    a voltage source means for connecting one terminal to said centrally located elongated member and said outer tube, and for connecting another terminal to said inner tube.

2. The electrolytic treatment apparatus as in claim 1, said centrally located member is solid.

3. The electrolytic treatment apparatus as in claim 1, wherein said centrally located member is tubular.

4. The electrolytic treatment apparatus as in claim 2, wherein said tubular centrally located member has a plurality of apertures passing therethrough.

5. The electrolytic treatment apparatus as in claim 1, wherein said centrally located member and said outer tube are made of materials which act as anodes, and wherein said inner tube is made of material which act as a cathode.

6. The electrolytic treatment apparatus as in claim 1, wherein said centrally located member and said outer tube are made of materials which act as cathodes, and wherein said inner tube is made of material which act as an anode.

7. The electrolytic treatment apparatus as in claim 1, wherein said centrally located member is made of a material which acts as cathode, and wherein said inner and outer tubes are made of materials which act as anodes.

8. The electrolytic treatment apparatus as in claim 1, wherein said centrally located member is made of a material which acts as anode, and wherein said inner and outer tubes are made of materials which act as cathodes.

9. The electrolytic treatment apparatus as in claim 1, wherein said centrally located member and said inner tube are made of materials which act as anodes, and wherein said outer tube is made of a material which acts as a cathode.

10. The electrolytic treatment apparatus as in claim 1, wherein said centrally located member and said inner tube are made of materials which act as cathodes, and wherein said outer tube is made of a material which act as an anode.

11. The electrolytic treatment apparatus as in claim 1, further comprising spacers having different resistances for varying the voltage drops applied across portions of said centrally located elongated member and inner and outer tubes.

12. The electrolytic treatment apparatus as in claim 1, further comprising pole reversal switch means for periodically reversing the polarity of said centrally located elongated member and inner and outer tubes.

13. The electrolytic treatment apparatus as in claim 1, further comprising means added within said tubes for increasing the reactivity area thereof.

14. The electrolytic treatment apparatus as in claim 1, further comprising means added to said liquids for increasing metal ion concentration for increasing the efficiency of said electrolytic treatment apparatus.

15. The electrolytic treatment apparatus as in claim 1, wherein the centrally located elongated member is treated.

16. The electrolytic treatment apparatus as in claim 1, wherein the inner tube is treated.

17. The electrolytic treatment apparatus as in claim 1, wherein the outer tube is treated.

18. The electrolytic treatment apparatus as in claim 1, further comprising means added to said liquids for changing the nature of the sludge or precipitate formed.

19. The electrolytic treatment apparatus as in claim 1, further comprising means added to said liquids for improving removal of impurities from said liquids.

20. The electrolytic treatment apparatus as in claim 1, further comprising means added to said liquids for forming nonhazardous sludge or precipitate.

21. A method of purifying aqueous solutions, comprising the steps of:
passing said aqueous solution along an inner insulator wrapped around a centrally located solid rod, wherein said aqueous solution is in contact with the external surface of said centrally located solid rod and the internal surface of an inner tube;
passing said aqueous solution along an outer insulator wrapped around said inner tube, wherein said aqueous solution is in contact with the external surface of said inner tube and the internal surface of an outer tube;
connecting one terminal of a DC voltage source to said solid rod and said outer tube;
connecting another terminal of said DC voltage source to said inner tube;
applying a voltage across said solid rod, and said inner and outer tubes from said DC voltage source; and thereafter
removing suspended materials and dissolved solids from said aqueous solution.

22. The method of purifying aqueous solutions as in claim 21, wherein said steps of passing said aqueous solution along said solid rod and said outer tube comprise the steps of passing said solution along a solid rod and an outer tube which are made of metals which act as anodes, and wherein said step of passing said solution along said inner tube comprises the step of passing said solution along an inner tube which is made of a metal which acts as a cathode.

23. The method of purifying aqueous solutions as in claim 21, wherein said steps of passing said aqueous solution along said solid rod and said outer tube comprise the steps of passing said solution along a solid rod and an outer tube which are made of metals which act as cathodes, and wherein said step of passing said solution along said inner tube comprises the step of passing said solution along an inner tube which is made of a metal which acts as an anode.

24. The method of purifying aqueous solutions as in claim 21, further comprising the step of varying the step of applying a voltage.

25. The method of purifying aqueous solutions as in claim 21, further comprising the step of reversing the polarity across the terminals of said DC voltage source.

26. The method of purifying aqueous solutions as in claim 21, further comprising the step of recycling sludge.

27. The method of purifying aqueous solutions as in claim 26, wherein the step of recycling sludge comprises the step of introducing nucleation seed in said aqueous solutions.

28. The method of purifying aqueous solutions as in claim 21, further comprising the step of increasing the reactivity area of said tubes and rod.

29. The method of purifying aqueous solutions as in claim 21, further comprising the step of adding at least one substance to said aqueous solutions for increasing metal ion concentration for improving the removal of impurities from said aqueous solutions.

30. The method of purifying aqueous solutions as in claim 21,

31. The method of purifying aqueous solutions as in claim 21, wherein said step of passing said aqueous solution around said inner tube comprises the step of passing said aqueous solution around a treated inner tube.

32. The method of purifying aqueous solutions as in claim 21, further comprising the step of adding at least one substance to said aqueous solutions for changing the nature of the sludge or precipitate formed.

33. The method of purifying aqueous solutions as in claim 21, further comprising the step of adding at least one substance to said aqueous solutions for improving removal of impurities from said liquids.

34. The method of purifying aqueous solutions as in claim 21, further comprising the step of adding at least one substance to said aqueous solutions for forming non-hazardous sludge or precipitate.

35. A method of purifying aqueous solutions, comprising the steps of:
passing said aqueous solution along the internal surface of an innermost tube;
passing said aqueous solution along an inner insulator wrapped around said innermost tube, wherein said aqueous solution is in contact with the external surface of said innermost tube and the internal surface of an inner tube;

passing said aqueous solution along an outer insulator wrapped around said inner tube, wherein said aqueous solution is in contact with the external surface of said inner tube and the internal surface of an outer tube;

connecting one terminal of a DC voltage source to said innermost tube and said outer tube;

connecting another terminal of said DC voltage source to said inner tube;

applying a voltage across said innermost tube, said inner tube and said outer tube from said DC voltage source; and thereafter removing suspended materials and dissolved solids from said aqueous solution.

36. The method of purifying aqueous solutions as in claim 29, wherein said steps of passing said aqueous solution along said innermost tube and said outer tube comprise the steps of passing said solution along an innermost tube and an outer tube which are made of metals which act as anodes, and wherein said step of passing said solution along said inner tube comprises the step of passing said solution along an inner tube which is made of a metal which acts as a cathode.

37. The method of purifying aqueous solutions as in claim 29, wherein said steps of passing said aqueous solution along said innermost tube and said outer tube comprise the steps of passing said solution along an innermost tube and an outer metal which are made of metals which act as cathodes, and wherein said step of passing said solution along said inner tube comprises the step of passing said solution along an inner tube which is made of a metal which acts as an anode.

38. The method of purifying aqueous solutions as in claim 35, wherein said step of passing said aqueous solution around said innermost tube comprises the step of passing said aqueous solution around a treated innermost tube.

39. The method of purifying aqueous solutions as in claim 35, wherein said step of passing said aqueous solution around said inner tube comprises the step of passing said aqueous solution around a treated inner tube.

40. A method for removing starch from an aqueous material, which comprises said aqueous material containing said starch through an electrolytic treatment apparatus for liquids, comprising:

a centrally located elongated member for allowing said aqueous material to pass therealong:

an inner insulator means for wrapping around said centrally located elongated member and for allowing said aqueous material to pass along the external surface thereof;

an inner tube for enclosing said inner insulator means and for allowing said aqueous material to pass along the external and internal surfaces thereof;

an outer insulator means for wrapping around said inner tube and for allowing said aqueous material to pass along the external surface thereof;

an outer tube for enclosing said outer insulator means and for allowing said aqueous material to pass along the internal surface thereof;

a housing means having inlet and outlet portions, whereby starch is recovered from said aqueous material.

41. A method of claim 40, wherein said electrolytic treatment apparatus for water includes a voltage source means for connecting one terminal to said centrally located elongated member and said outer tube, and for connecting another terminal to said inner tube.

42. A method of claim 14 wherein said centrally located member is tubular.

43. A method for removing rendering plant effluent fats from an aqueous material, which comprises said aqueous material containing said rendering plant effluent fats through an electrolyte treatment apparatus for liquids, comprising:

a centrally located elongated member for allowing said aqueous material to pass therealong;

an inner insulator means for wrapping around said centrally located elongated member and for allowing said aqueous material to pass along the external surface thereof;

an inner tube for enclosing said inner insulator means and for allowing said aqueous material to pass along the internal and external surfaces thereof;

an outer insulator means for wrapping around said inner tube and for allowing said aqueous material to pass along the external surface thereof;

an outer tube for enclosing said outer insulator means and for allowing said aqueous material to pass along the internal surface thereof;

a housing means having inlet and outlet portions, whereby rendering plant effluent fats is recovered from said aqueous material.

44. A method of claim 43, wherein said electrolytic treatment apparatus for water includes a voltage source means for connecting one terminal to said centrally located elongated member and said outer tube, and for connecting another terminal to said inner tube.

45. A method of claim 44, wherein said centrally located member is tubular.

46. A method for removing gold from an aqueous material, which comprises said aqueous material containing said gold through an electrolytic treatment apparatus for liquids, comprising:

a centrally located elongated member for allowing said aqueous material to pass therealong;

an inner insulator means for wrapping around said centrally located elongated member and for allowing said aqueous material to pass along the external surface thereof;

an inner tube for enclosing said inner insulator means and for allowing said aqueous material to pass along the internal and external surfaces thereof;

an outer insulator means for wrapping around said inner tube and for allowing said aqueous material to pass along the external surface thereof;

an outer tube for enclosing said outer insulator means and for allowing said aqueous material to pass along the internal surface thereof;

a housing means having an inlet and outlet portions, whereby gold is recovered from said aqueous material.

47. A method of claim 46, wherein said electrolytic treatment apparatus for water includes a voltage source means for connecting one terminal to said centrally located elongated member and said outer tube, and for connecting another terminal to said inner tube.

48. A method of claim 47, wherein said centrally located member is tubular.

* * * * *

UNITED STATES PATENT AND TRADEMARK OFFICE
CERTIFICATE OF CORRECTION

PATENT NO. : 4,872,959

DATED : October 10, 1989

INVENTOR(S) : Robert J. HERBST
Russell R. RENK

It is certified that error appears in the above-indentified patent and that said Letters Patent is hereby corrected as shown below:

Column 20, lines 42-43, claim 30 should read as follows:

30. The method of purifying aqueous solutions as in claim 21, wherein said step of passing said aqueous solution around a centrally located solid rod comprises the step of passing said aqueous solution around a centrally located treated solid rod.

Signed and Sealed this

Thirteenth Day of September, 1994

Attest:

BRUCE LEHMAN

*Attesting Officer*  *Commissioner of Patents and Trademarks*